June 28, 1932. C. N. KOCH 1,864,741
COMBUSTION TURBINE AND METHOD OF FEEDING AND BURNING FUEL
Filed June 15, 1923 6 Sheets-Sheet 1
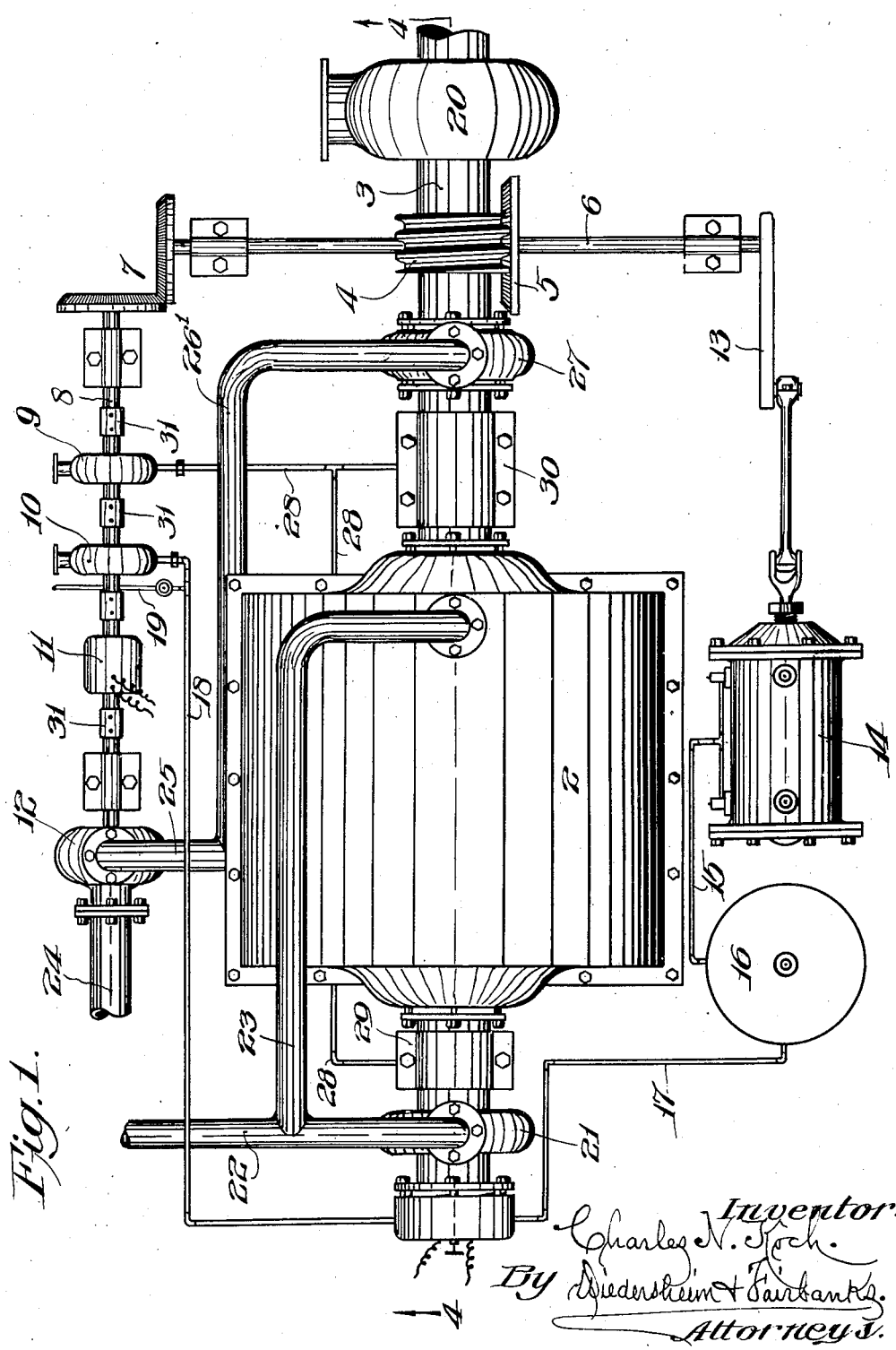

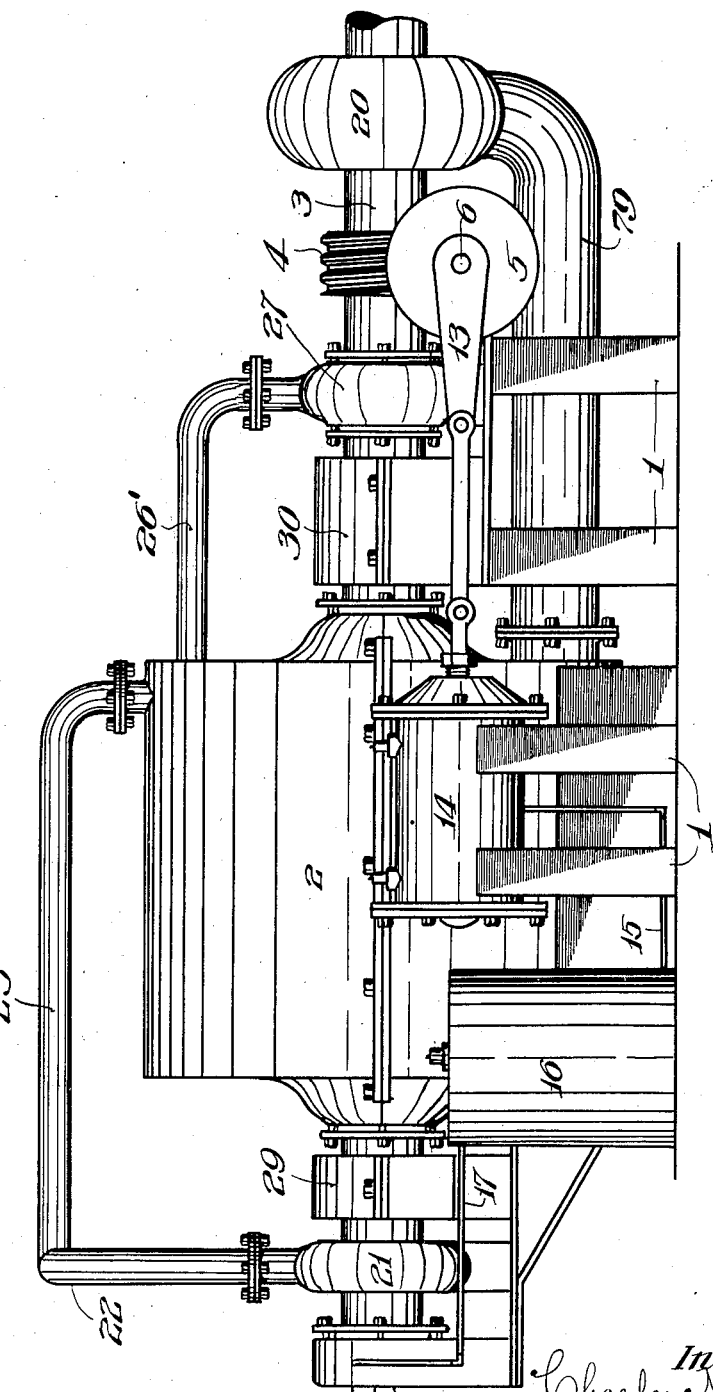

June 28, 1932. C. N. KOCH 1,864,741
COMBUSTION TURBINE AND METHOD OF FEEDING AND BURNING FUEL
Filed June 15, 1923 6 Sheets-Sheet 3
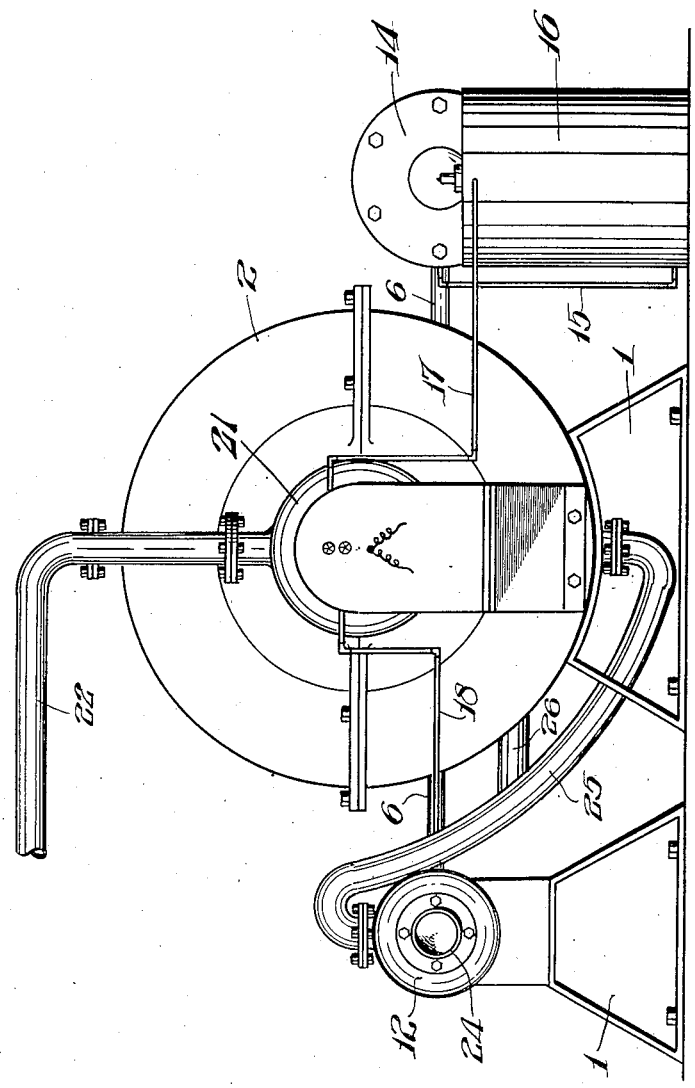

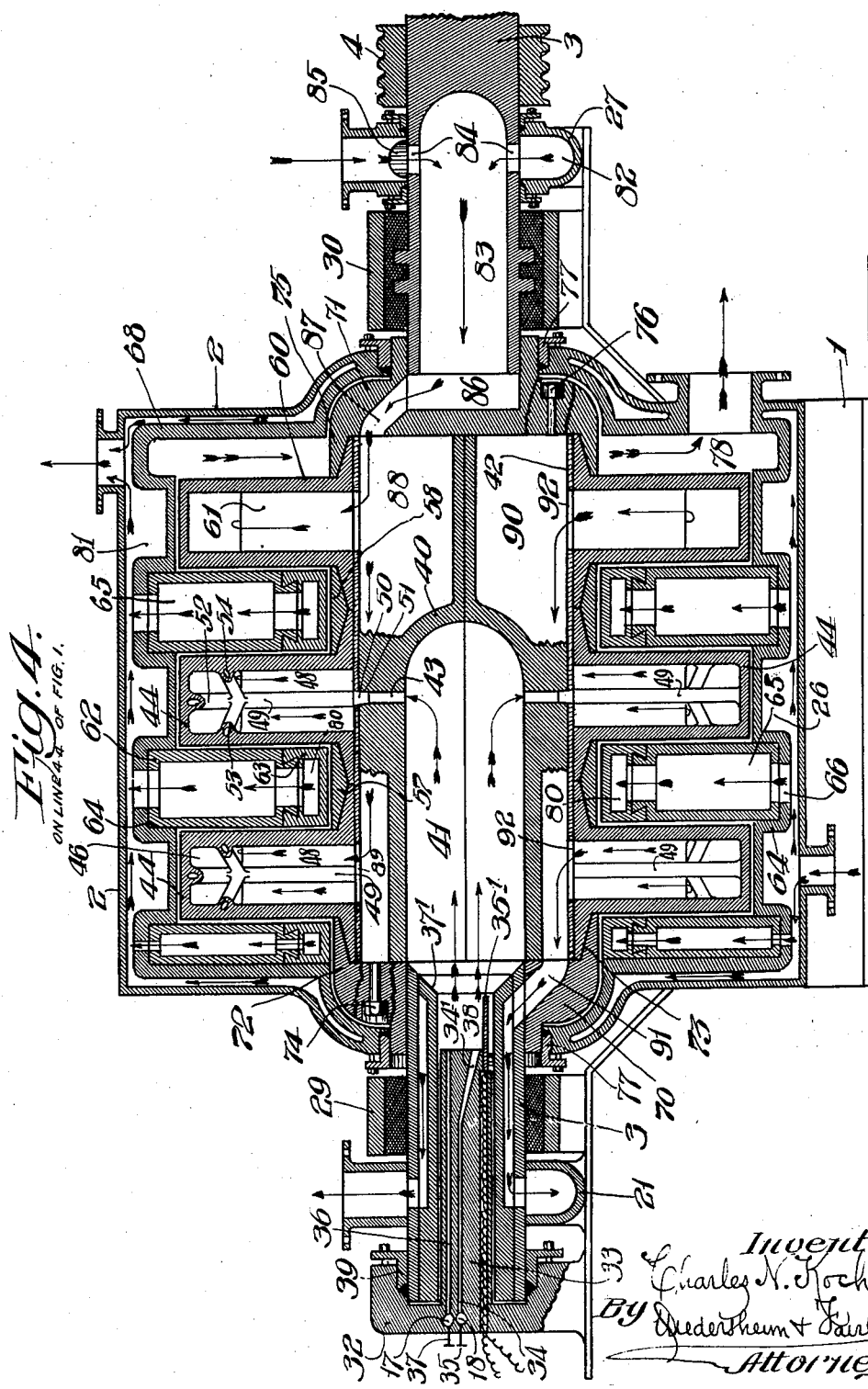

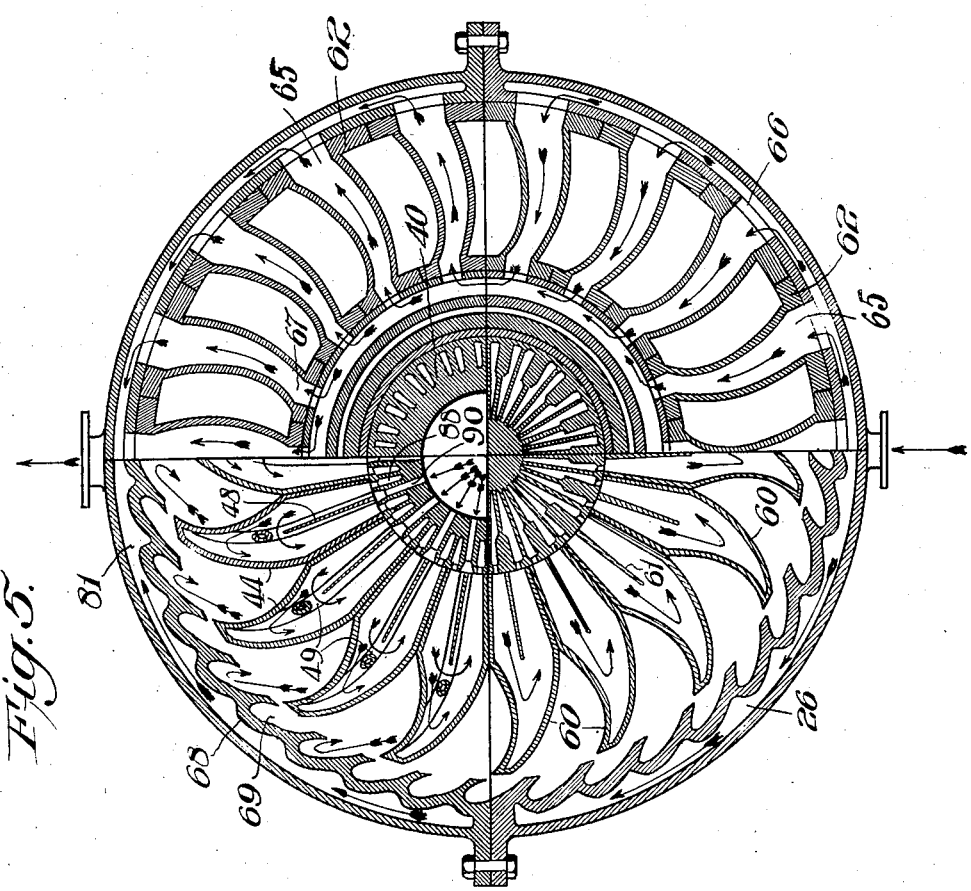

June 28, 1932. C. N. KOCH 1,864,741
COMBUSTION TURBINE AND METHOD OF FEEDING AND BURNING FUEL
Filed June 15, 1923   6 Sheets-Sheet 6
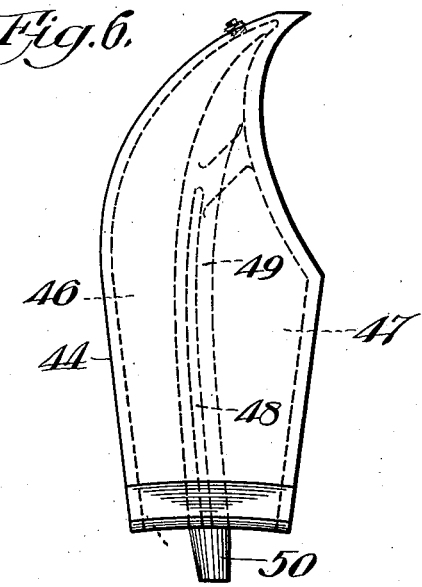
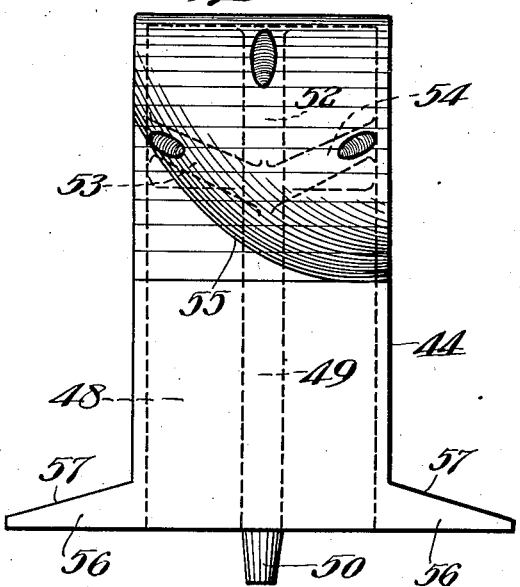
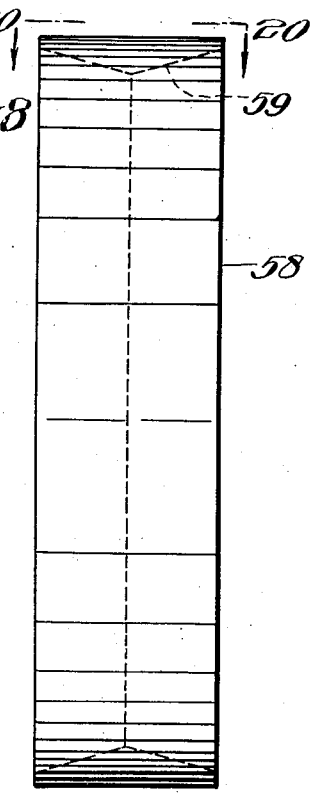
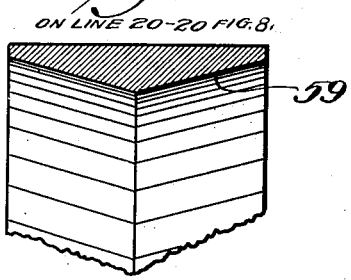

Patented June 28, 1932

1,864,741

UNITED STATES PATENT OFFICE

CHARLES N. KOCH, OF KANE, PENNSYLVANIA

COMBUSTION TURBINE AND METHOD OF FEEDING AND BURNING FUEL

Application filed June 15, 1923. Serial No. 645,709.

(GRANTED UNDER THE ACT OF MARCH 3, 1883, AS AMENDED APRIL 30, 1928; 370 O. G. 757)

One of the main objects of my invention is to devise a combustion turbine and a novel method of and means for feeding, mixing and burning the motive fluid wherein the ignitable motive fluid is continuously fed into the combustion chamber under a substantially constant pressure to maintain therein a continuous and constant pressure and expansion of the incandescent gases in the combustion chamber. This together with my devised means whereby the motive fluid is combusted at different initial combustion volumes within the combustion chamber, my devised means for feeding air into said chamber intermediate said combustion volumes, and my devised means whereby said chamber and the points of feeding air and motive fluid thereto are relatively moved or rotated, each severally and jointly produce such turbulence within said chamber as affords more complete combustion of the motive fluid, produces greater rapidity of flame propagation, greater velocity of the combusted products delivered to the working surface of the turbine, greater fuel economy and efficiency.

Another object of my invention is to devise a novel combustion engine and method of introducing the component parts of the motive fluid and effecting their ignition to produce an expansive motive fluid which will create a greater rotative thrust on a turbine rotor or similar engine at any desired rotatable speeds. The component parts of the turbine are so constructed and arranged as to confine the heat and pressure of the expansive gases to such points and locations in the turbine that a greater rotative thrust and a greater economy may be obained with a minimum consumption of fuel.

A further object of my invention is to devise a novel construction for and a novel method of circulating a cooling medium within and through such parts as are in contact with the highly heated gas, in order to prevent their deterioration.

With the above and other objects in view which will hereinafter appear in the detailed description and the appended claims, my invention comprehends a novel construction and arrangement of a combustion engine wherein novel means are employed for creating and effecting the ignition of an expansible motive fluid, a novel construction and arrangement of the rotor and stator elements, novel means for introducing the motive fluid into the expansion space of the turbine and novel means for cooling the component parts of the turbine.

It further comprehends a novel method of carrying out the various steps involved in the creation and introduction of the motive fluid and for cooling the component parts of the turbine.

It further comprehends a novel construction of a combustion turbine wherein the motive fluid is ignited within a chamber of the rotor and in close proximity to the turbine blading of the rotor.

Other novel features of construction and advantage will hereinafter more clearly appear in the detailed description.

For the purpose of illustrating my invention, I have shown in the accompanying drawings embodiments thereof which are at present preferred by me, since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of a combustion engine, embodying my invention, and illustrative of one construction by means of which my novel methods can be carried out.

Figure 2 represents a side elevation of the turbine.

Figure 3 represents an end elevation showing the forward end of the turbine.

Figure 4 represents a section taken substantially on line 4—4 of Figure 1 but having certain of the parts broken away for the sake of clearness of illustration.

Figure 5 represents an irregular cross section of the turbine, one half being taken through the rotor blading and the other half through the stator blading, the section being taken so as to show the high and low pressure rotor and stator blading.

Figure 6 represents, in side elevation, and in detached position, a rotor blade.

Figure 7 represents, in front elevation, the rotor blade seen in Figure 6.

Figure 8 represents, in front elevation, the rotor blade securing ring.

Figure 9 represents a section on line 20—20 of Figure 8.

Similar numerals of reference indicate corresponding parts.

Referring to the drawings.

*General construction and arrangement*

The general construction and arrangement of the turbine will be best understood by reference to Figures 1, 2, 3, 4 and 5.

1 designates the supporting framework, see Figures 2, 3 and 4, on which the various parts are supported. 2 designates the turbine casing which is made in sections for the convenience of assembling. 3 designates the rotor shaft, see Figures 1 and 2, which is provided with the worm 4 which meshes with a worm wheel 5 mounted on a jack shaft 6, which is intergeared, as at 7, with the shaft 8 which drives the auxiliaries such as, for example, lubricating pump 9, fuel pump 10, generator 11 and cooling medium pump 12. The jack shaft 6 has connected with it a crank 13 which is operatively connected with the piston of the air compressor 14 in any desired manner. The air compressor 14 is connected by means of the pipe 15 with the accumulator 16 from which leads the air supply line 17 to the controlling valve of the nozzle, as will be hereinafter explained.

The fuel pump 10 has a fuel line 18 leading therefrom to the fuel nozzle and is provided with a valve controlled by-pass 19. 20 designates an exhaust pump which carries away the spent gases. 21 designates the discharge receptacle for the cooling medium from the rotor which returns the cooling medium by means of a conduit 22 to the source of supply of the cooling medium and communicating with such conduit 22 is a conduit 23 which communicates with the casing to discharge the cooling medium therefrom. The cooling medium is brought from the source of supply through the conduit 24 to the pump 12 for the cooling medium from which leads the conduit 25, see Figure 3, which leads to the cooling medium chamber 26, see Figure 4, of the cooling medium jacket of the casing. A conduit 26′ leads from the conduit 25 to the receptacle 27, see Figures 1 and 2, which conducts the cooling medium to the rotor blading and drum, as will be hereinafter explained. The lubricating pump 9 communicates by means of a pipe 28 with the steady bearing 29 and the journal and thrust bearing 30, see Figure 1. The shaft 8 is preferably made in sections and connected by coupling sleeves 31, see Figure 1.

*Mechanism for creating and effecting the ignition of the motive fluid*

Referring now more particularly to Figure 4, 32 designates an end cap and stuffing box which I have preferred to illustrate as having integral with it a nozzle 33 having a fuel passage 34 which communicates with the fuel line 18 and is provided with a manually controlled valve 35. The discharge end of the fuel passage 34 is preferably tapered and inclines downwardly, as at 34′, in order that the fuel will impinge on an electrically heated hot plate 35′, the current for which may come from any desired source.

The air line 17 communicates with the nozzle air passage 36 which is controlled by means of the manually actuated valve 37. The stationary nozzle 33 fits into the bore of a rotatable sleeve 37′, the outward end of which is flaring and provides a chamber 38 in which the fuel is initially ignited. The sleeve 37′ forms a fluid tight joint with the end portion of the rotor shaft 3. 39 designates a stuffing box. 40 designates the rotor drum.

*The rotor and its adjuncts*

The rotor drum 40 is internally chambered to form a combustion chamber 41 which is in free communication with the chamber 38 and forms a continuation thereof. The rotor drum 40 is preferably made in one piece but, as illustrated, is provided with an outer shell or sleeve 42 which has in its periphery circumferentially arranged rows of ports 43 which extend through the drum and communicate with the combustion chamber 41, so that the incandescent gases can pass to the rotor or nozzle blades 44, the construction and arrangement of which will now be described, reference being directed more particularly to Figures 4 to 9 inclusive.

Referring now more particularly to Figures 6 and 7, the high pressure rotor blades, which are the nozzle blades, may be formed in any desired manner and are provided with an internal chamber which is divided into two chambers 46 and 47 by means of a baffle or diaphragm 48 which has a fluid tight fit with the juxtaposed walls at its bottom and sides. This baffle or diaphragm 48 may or may not have connected with it the gas tube 49, the lower end of which extends below the base of the blade and is preferably conical, as at 50, in order that it may have a fluid tight fit in the correspondingly shaped portion 51 of the passage 43 in the rotor drum 40, see more particularly Figure 4. The baffle or diaphragm 48 terminates a desired distance from the tip of the blade. The gas tubes 49 are provided with a plurality of branches and for purpose of illustration, I have shown three of such branches 52, 53 and 54 which open through the working face of the blade. The branch 52 preferably opens into the working face of the blade preferably near the tip thereof and the side branches 53 and 54 preferably open into the working face of the blade near the sides thereof, and they are at an angle to the branch 52, so that they tend to discharge the gases laterally, so that they will strike the stator blades and the annular blades and then react on the working faces of the rotor blades. It will be noticed from Figure 7 that the working face of the high pressure rotor blade has a deflecting curved boss 55, Figure 7, which merges into an inward curvature so that such portion of the blade will have a tendency to deflect the gases to the next or adjoining set of stator blades in the direction of the flow of gases in the turbine casing. The base of each high pressure rotor blade 44 is provided with the base flanges 56 on opposite sides, said flanges being tapered downwardly, as at 57. The rotor blades are secured in position on the rotor drum 40 by means of locking rings 58, see Figures 4, 8 and 9. These locking rings have their inner walls reversely inclined, as at 59, Figures 8 and 9 so that they will contact with the inclined faces 57 of the base flanges 56 and securely lock the rotor blades to their drum 40, when the parts are clamped together, as will be hereinafter explained.

The low pressure rotor blades 60, see Figure 4, are provided with a diaphragm 61 similar to the diaphragm 48 but are not provided with the gas tubes, such as are blades 49. 62 designates the stator blades which are connected with an inner shrouding 63, see Figure 4, and at their outer ends they are seated in recesses 64 in the turbine casing 2. These stator blades are internally chambered, as at 65, and at their outer ends in the lower half they open into the chamber 26, as at 66. They are also open at their inner ends, as, indicated at 67, see Figure 5.

I will next explain the manner in which the rotor and stator blades are securely locked with respect to the rotor drum 40. I provide clamping heads 70 and 71. The clamping head 70 is provided with the annular flange 72 which diverges outwardly, as indicated at 73, so that it will have a tight fit and a drawing action when brought into engagement with the correspondingly inclined faces 57 of the blades 56 of the juxtaposed high pressure rotor blades, see Figures 4 and 7. The clamping head 70 is secured to the rotor drum 40 by means of fastening devices 74. In a similar manner, the clamping head 71 is provided with a flange 75 having its inner face tapered to co-operate with the flanges of the juxtaposed rotor blades. This clamping head 71 is fixed to the rotor drum by means of fastening devices 76. It will thus be seen that the rotor drum and its adjuncts are fixedly connected with the rotor shaft.

77 designates stuffing boxes, see Figure 4. The gases exhaust from the turbine through the chamber 78, see Figure 4, and through the exhaust conduit 79, see Figure 2, and the exhaust pump 20.

*Circulation of the cooling medium*

The cooling medium as before explained comes from a source of supply through the conduit 24 to the pump 12, see Figure 1, and thence through the conduit 25 into the chamber 26, see Figure 4, of the turbine casing 2, of the lower half of such casing, the cooling medium passes upwardly through the openings 66, see Figures 4 and 5, into the chamber 65 of the stator blading and through the opening 67 in the lower half into the chamber 80 of the shrouding and therefrom through the chambers in the stator blades in the upper half of the casing and into the chamber 81 of such upper half of the casing, and thence through conduit 23 to the source of supply of the cooling medium. I will next describe the passage of the cooling medium for the rotor blades and other component parts of the turbine. The cooling medium is fed from the pump 12, see Figure 1, through the conduit 26', through the admission receptacle 27 which has a chamber 82 surrounding the rotor shaft. The rotor shaft 3, see Figure 4, is internally chambered, as at 83, and is provided with the circumferentially spaced ports 84 which communicate with the chamber 82. The rotor shaft 3 is preferably provided with a scoop 85 which faciliates the cooling medium entering such port. Scoop 85 comprises a lip shaped projection extending tangentially from the shaft. The chamber 83 communicates with a chamber 86 in the clamping head 71, and said chamber 86 communicates by means of passages 87 with the passages 88 which extend longitudinally through the rotor drum, but are blanked off opposite to the end of admission by the clamping head 70. I thus provide a series of supply chambers extending longitudinally of the rotor drum and circumferentially spaced from each other, so that there is a separate supply chamber for each longitudinal row of blading.

The rotor hub, see Figure 4, has its sleeve 42 provided with the circumferentially spaced slots 89. The rotor drum is provided with circumferentially spaced longitudinally extending passages 90 which are blanked off at one end by the clamping head 71 and which communicate with the passages 91 leading to the discharge receptacle 21, see Figure 4, it being understood that the passages 88 and 90 are alternately arranged, the passages 88 serving as inlet passages and the passageways 90 serving as outlet passages. The cooling medium passes from the passageways or chambers 88 in the direction of the single tail arrows, see Figure 4, and also Figure 5, passing upwardly in front of the diaphragm 48 to effectively cool the working faces of the rotor blade and then down through the chamber 46 and through the ports or slots 92 into the passageways 90 and therefrom to the passages 91 to the discharge receptacle 21 and therefrom through the pipe 22 to the source of supply of the cooling medium. In this manner, as will be apparent, the part of the metal which is subjected to the greatest heat is kept below destructive temperatures.

The operation

The operation of the construction thus far described is as follows:—

I will first describe the operation of a small unit, and thereafter of a large unit. Assuming now that the circuit for the cooling medium is open and that the source of supply is sufficient to maintain the proper cooling action, the electric current is turned on to effect the heating of the hot plate 35'. The air accumulator if not charged with compressed air is charged by a manually or otherwise operated air pump. The fuel valve 35 and the air valve 37 are opened, and combustion at once takes place in the chamber 38 and in the chamber 41 of the rotor drum. The combustion gases are now incandescent passing through the passages 43 and pipes 49, and are discharged through the branches of the pipes and through the working faces of the high pressure rotor or nozzle blades. The gases pass to the adjacent stator blades and also to the annular blading 68 to react on the succeeding rotor blade, and then pass to the low pressure blading, and therefrom to the chamber 78 and through conduit 79 to the exhaust pump 20. It will be seen that as the combustion chamber is centrally located of the rotor drum the expansion of the metal is equal on all parts of the metal of the rotor drum. The expansive pressure is thus equally distributed to the rotor blading. As soon as the engine is in running condition, that is to say, when the engine is heated up and running normally, the source of supply of electric current to the hot plate 35' is cut off as the heat within the combustion chambers 41 and 38 is sufficient for continuous ignition. It will now be clear that in my present invention, I obtain a substantially constant and continuous combustion and expansive pressure, and also obtain an instantaneous ignition, burning and expansion of the fuel, so that I am enabled to obtain a constant pressure.

The passage of the cooling medium as well as its circulation has already been explained. As soon as the engine is running normally, the electric current is cut off and the heat generated within the chambers 41 and 38 will be maintained sufficiently high to create an instantaneous burning and expansion of the component parts of the fuel.

While in practice, I prefer to employ a cooling medium to keep the metal parts which are subjected to destructive temperatures below said temperatures, it will be apparent that if the metal parts can withstand such temperatures the circulation of the cooling medium can be dispensed with.

The shape and arrangement of the blading is such that a large amount of the energy in the incandescent gases can be utilized before reaching the point of exhaust, and, it will be apparent, that any desired number of rotor and stator units can be employed, so that the temperature at the point of exhaust and the pressure as well can be any determined temperature and pressure by the amount of fuel used, and the pressure if desired can be brought down below atmospheric pressure.

It will now be apparent that in the methods herein disclosed, I am enabled to maintain in the combustion space, under normal working conditions, a continuous ignition and burning of the ignitable gases and a continuous and constant expansion and pressure of the burning gases. The ignitable fuel of any desired nature is introduced into the combustion space or preliminarily into the ignition space at which the flash takes place under a continuous and constant pressure. The ignition takes place instantaneously, initially due to the hot plate, and, after the engine is heated up and running under normal working conditions, due to the high temperature within the ignition and combustion spaces.

The incandescent fuel in the combustion space is conducted by as short a path as possible into the working or expansion space of the turbine and preferably through the nozzle or high pressure rotor blades and discharges through the working faces of such blades preferably in such directions as to enable one to utilize all of the kinetic energy present in the incandescent gases.

Due to the inclination and curvature of the fuel pipes, the incandescent gases act against the stator blading and the annular blading, and react from the annular blading and stator blading against the rotor blading, the general course of the incandescent gases passing to the low pressure blading being parallel with the rotor shaft and its drum. Due to the rotating nozzles, a constant and continuous thrust is exerted to effect the rotation of the rotor drum at all peripheral points on the rotor. The rotor drum 40 is, in a sense, the equivalent of a manifold to provide a constant and continuous supply of incandescent gases, and such manifold discharges directly through each conduit 48 of the high pressure rotor blading. The gases inlet nozzle, as will be apparent, will become highly heated so that it will act to highly heat the fuel and air passing therethrough.

It will now be apparent that I have devised a new and useful combustion turbine which embodies the features of advantages enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

The invention herein described may be manufactured and used by and for the Government of the United States for governmental purposes without the payment to me of any royalty thereon or therefor.

Having thus described my invention, what I claim as new and desire to secure by Letters Patent, is:—

In a combustion turbine, a frame, a stator member mounted in said frame, a rotor member having a shaft secured thereto, bearings in said frame for said shaft, cooling medium passages through said members and shaft, a common means for compelling the flow of said medium through said passages, auxiliary means for supplementing the flow of said medium through said passages in said shaft and said rotor member, and means for driving said common and said auxiliary means from said shaft.

CHARLES N. KOCH.